Patented Jan. 8, 1946

2,392,713

UNITED STATES PATENT OFFICE 2,392,713

PROCESS OF PREPARING DIMETHYL SILICONE ELASTOMERS

James G. E. Wright, Alplaus, and Curtis S. Oliver, Schenectady, N. Y., assignors to General Electric Company, a corporation of New York No Drawing. Application July 1, 1944, Serial No. 543,204

8 Claims. (Cl. 260—2)

The present invention relates to the preparation of dimethyl silicone elastomers. Specifically, it is concerned with a process of reclaiming cured or partially cured or vulcanized silicone elastomers for use in the production of moldable or extrudable elastomeric compositions.

Silicone elastomers of the type with which the present invention is concerned and their preparation are described in the copending application of Maynard C. Agens, Serial No. 526,473 and the copending application of James G. E. Wright and Curtis S. Oliver, Serial No. 526,472, both of which applications were filed March 14, 1944, and assigned to the same assignee as the present invention. Briefly described, they comprise dimethyl silicones having a methyl-to-silicon ratio of from 1.98 to 2.00 and suitable fillers. They are prepared for example by treating a liquid dimethyl silicone having a methyl-to-silicon ratio of from 1.98 to 2.00 and consisting essentially of dimethyl-substituted silicon atoms with an agent such as ferric chloride hexahydrate to convert the liquid silicone to a gum and working the gum on rubber rolls with suitable fillers, etc., to form a moldable or extrudable mass which on being heat-treated is converted to an elastomer. To obtain elastomers possessing maximum strength the molded or extruded material is given a further cure by suitable heat-treatment after removal from the molding or extruding apparatus. In the cured or vulcanized state, the silicone elastomers exhibit all of the various properties of vulcanized natural rubber and are particularly characterized by their flexibility at low temperatures and their resistance to heat.

In the preparation of these dimethyl silicone elastomers and the manufacture of shaped articles from the elastomeric materials, there is obtained a considerable quantity of cured or partially cured scrap material in the form of trimmings, rejected articles, etc. As the cured silicone elastomers, like vulcanized rubber, will not deform to any substantial extent under ordinary elevated temperatures and pressures, this scrap material as such cannot be satisfactorily molded or extruded.

The present invention is based on the discovery that when this scrap silicone elastomer is treated with a small amount of dimethyldihalogenosilane, it is almost immediately broken down to a sticky or gummy mass which on further working, for example on mixing rolls, becomes indistinguishable from a silicone elastomer prepared from a fresh silicone gum and can be molded or extruded and cured in the same manner as the fresh gum. The reclamation of the cured scrap elastomer is preferably carried out by mixing the dihalogenosilane with the ground or disintegrated elastomer while the latter is being worked on mixing rolls or other suitable mixing device. If the scrap elastomer has been over-cured or subjected to elevated temperatures for a prolonged period of time, it may be found desirable to add a little fresh dimethyl silicone gum along with the dihalogenosilane. In general, the amount of dimethyldihalogenosilane should not exceed 2 per cent by weight of the silicone content of the material being reclaimed. Best results are obtained with from 0.5 to 1.5 per cent by weight of the dihalogenosilane.

To facilitate the conversion of the reclaimed elastomer to a heat-curable moldable or extrudable mass, a small amount of benzoyl peroxide can be added to the reclaimed material during milling thereof. The effect of this compound as a curing catalyst for silicone elastomers is more fully described in the Wright and Oliver application referred to hereinbefore. The amount of benzoyl peroxide employed generally will comprise from 1 to 5 per cent by weight of the dimethyl silicone content of the mass and will depend to some extent on the amount of benzoyl content originally used in making the elastomer.

The effect of the dimethyldihalogenosilane on a silicone elastomer and its use in the reclamation of otherwise useless silicone elastomer scrap material is illustrated by the following example:

*Example.*—A dimethyl silicone oil having a methyl-to-silicone ratio of approximately two was treated with ferric chloride hexahydrate, as described and claimed in the above-mentioned Agens application, to convert it to a gum and 100 parts of this gum was mixed with 200 parts by weight of titanium dioxide and 2 parts benzoyl peroxide on mixing rolls at room temperature. The resultant mass was molded at an elevated temperature and the molded product was heated for 15 hours at 150 deg. C. The cured elastomer was divided into three portions which were treated as follows: one portion of the silicone elastomer on the rolls, when worked at room temperature, it tore apart and disintegrated. When milled at 125 deg. C. for 20 minutes the disintegrated material began to sheet well but became very plastic. If slowly stretched this plastic mass remained elongated when the stress was relieved. Sheets molded from this product at temperatures between 125 and 150 deg. C. for ten minutes possessed little or no tear resistance and were still plastic.

A second portion of the same cured silicone elastomer was milled on mixing rolls at room temperature until torn apart. A toluene solution of 1.5 per cent by weight of dimethyldichlorosilane based on the weight of the silicone content of the elastomer was then added. Immediately the elastomer became sticky and after about five minutes milling, the material behaved exactly as the original silicone mass before curing. Two per cent by weight of benzoyl peroxide (in toluene solution) was then added and the milling continued for another five minutes. The strength, elasticity, and other physical properties of the sheet product molded from this reworked elastomer were practically indistinguishable from the products of other silicone elastomers containing the same type and amounts of fillers and benzoyl peroxide.

A third portion of the same cured silicone elastomer was milled on mixing rolls at room temperature until torn apart. On continued milling, the disintegrated material became quite hot (80 deg. C.) and was converted to a plastic mass which when slowly stretched, remained elongated after the stress was relieved. Two per cent by weight of benzoyl peroxide (in toluene solution) was added to the mass and the milling continued for another five minutes. The tear and tensile strengths, elasticity, and other physical properties of the sheet product molded from this reworked compound were decidedly inferior to the molded products obtained from the portion treated with dimethyldichlorosilane.

Although the invention has been described with specific reference to dimethyldichlorosilane, it is to be understood that other halogenosilanes such as dimethyldibromosilane may be substituted for the dimethyldichlorosilane without departing from the spirit of the invention.

What we claim as new and desire to secure by Letters Patent of the United States, is:

1. The process of reclaiming a dimethyl silicone elastomer which comprises treating said elastomer with a small amount of a dimethyldihalogenosilane.

2. The process of reclaiming a dimethyl silicone elastomer which comprises milling said elastomer on mixing rolls with a small amount of a dimethyldihalogenosilane.

3. The process of converting a dimethyl silicone elastomer into a composition capable of being molded or extruded which comprises treating said elastomer with a small amount of a dimethyldihalogenosilane.

4. A process for reclaiming a dimethyl silicone elastomer which comprises disintegrating the elastomer and intimately mixing the disintegrated material with a small amount of dimethyldichlorosilane.

5. A process for reclaiming a dimethyl silicone elastomer which comprises treating said elastomer with less than about 2 per cent by weight of dimethyldichlorosilane based on the weight of the dimethyl silicone content of the elastomer.

6. The process of converting a dimethyl silicone elastomer into a moldable, heat-curable material which comprises treating said elastomer with from 0.5 to 1.5 per cent by weight of dimethyldichlorosilane based on the dimethyl silicone content of the elastomer.

7. The process of treating a dimethyl silicone elastomer which is substantially non-moldable under heat and pressure conditions to convert it into a moldable elastomeric composition which comprises treating said silicone elastomer with a small amount of dimethyldichlorosilane not exceeding 2 per cent by weight based on the weight of the dimethyl silicone present in said elastomer.

8. The process which comprises disintegrating a dimethyl silicone elastomer comprising a heat-treated mixture of a dimethyl silicone gum and a filler, and intimately mixing the disintegrated product with less than 2 per cent dimethyldichlorosilane and from 1 to 5 per cent benzoyl peroxide based on the dimethyl silicone content of said elastomer until a moldable, heat-curable product is obtained.

JAMES G. E. WRIGHT.
CURTIS S. OLIVER.